(12) United States Patent
Stojkovic et al.

(10) Patent No.: US 7,654,607 B2
(45) Date of Patent: Feb. 2, 2010

(54) AUTOMOTIVE BODY STRUCTURE WITH SPIN WELDED HARDWARE MOUNTS

(75) Inventors: Dragan Stojkovic, Southgate, MI (US); Larry Dupuis, Grosse Ile, MI (US); James Lowe, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 11/620,734

(22) Filed: Jan. 8, 2007

(65) Prior Publication Data

US 2008/0164717 A1 Jul. 10, 2008

(51) Int. Cl.
*B60J 5/02* (2006.01)
(52) U.S. Cl. ...................... 296/146.8; 16/221
(58) Field of Classification Search .............. 296/146.8; 16/221
See application file for complete search history.

(56) References Cited

U.S. PATENT DOCUMENTS

| 3,477,115 | A | 11/1969 | Martin et al. |
| 4,642,869 | A | 2/1987 | Muller |
| 5,713,706 | A | 2/1998 | Lozano |
| 6,227,433 | B1 | 5/2001 | Waldron et al. |
| 6,454,891 | B1 | 9/2002 | Goss |

FOREIGN PATENT DOCUMENTS

| EP | 0 780 581 | 6/1997 |
| FR | 2 650 037 | 4/1991 |
| GB | 1192890 | 5/1970 |

*Primary Examiner*—Lori L Lyjak
(74) *Attorney, Agent, or Firm*—Jerome R. Drouillard; Fredrick Owens

(57) ABSTRACT

An automotive body structure includes a tubular load bearing structure and a hardware mount having a base plate with an annular axially extending spin welding initiator. The hardware mount is spin welded to the load bearing structure to provide a reinforced location for the mounting of automotive hardware, such as door hinges, with threaded fasteners.

19 Claims, 2 Drawing Sheets

AUTOMOTIVE BODY STRUCTURE WITH SPIN WELDED HARDWARE MOUNTS

BACKGROUND OF THE INVENTION

1. Field of the Invention

The present invention relates to a system and method for providing hard points for mounting vehicle hardware, such as door hinges, to tubular structural members.

2. Disclosure Information

Automotive designers continually seek ways to improve fuel economy. Given the inexorable link between vehicle weight and fuel economy, weight reduction is a constant, invariant, objective of vehicle engineers. The quest for weight reduction has led to increasing use of hydroformed members in vehicle bodies and other structural members. In general, hydroformed members provide great strength with low weight. The low weight comes about in part because the gauge thickness of the walls of hydroformed parts may be relatively light. Unfortunately, this necessitates special processes for accommodating threaded fasteners with hydroformed parts. For example, it is known to provide weld nuts which must be installed from both sides of the surface into which the nut is placed. This necessitates the placing of an additional hole in the hydroformed part, which could have the undesirable effect of reducing the strength of the part. It is also known to weld added plates to hydroformed and other tubular parts, for the purpose of locally strengthening the part, thereby providing excellent purchase for a fastener. However, the added burden of welding such parts increases the expense and complexity of the vehicle.

It would be desirable to provide a structure enabling the use of threaded fasteners with tubular parts, such as hydroformed parts, without the necessity of additional welding, and also without the necessity of piercing holes on both sides of a part into which a fastener, such as a weld nut, is to be inserted.

SUMMARY OF THE INVENTION

According to an aspect of the invention, an automotive body structure includes a tubular, load bearing structure and a hardware mount having a base plate with an annular, axially extending spin welding initiator. A spin welded joint is formed between the load bearing structure and the hardware mount. To enable the installation of fasteners into the mount, the mount preferably includes at least one fastener attached to the base plate. This fastener may be a generally tubular threaded nut or a threaded stud which is either integral with the base plate or welded to the base plate. In a preferred embodiment, the base plate and tubular nut are extruded, preferably from a ferrous material such as steel.

In a preferred embodiment, the hardware mount includes more than one integral fasteners which, after spin welding, extend through a common aperture into the interior of a tubular load bearing structure.

In yet another preferred embodiment, a hardware mount incorporating more than one fasteners is rotationally indexed to a predetermined position as the spin welded joint between the load bearing structure and the hardware mount is being completed. The spin welded hardware mount may be used for attaching hardware to a vehicle by threaded fasteners. Hardware may include such items as a hinge for a door.

According to another aspect of the present invention, a localized reinforcement may be applied to a tubular load bearing structure at the location of the hardware mount prior to spin welding the hardware mount.

It is an advantage of a method and structure according to the present invention that a hardware mount may be installed upon a load bearing structure for an automotive vehicle without the necessity of additional hand welding and with additional structural strength as compared with known methods and structures.

It is yet another advantage of a method and structure according to the present invention that oriented fastening may be provided by rotationally indexing a base having multiple integral fasteners, as part of the spin welding process.

It is yet another advantage of the present method and structure that hardware mounting plate may be provided without impairing the strength of the base tubular structure to which the plate is applied.

Other advantages, as well as features of the present invention will become apparent to the reader of this specification.

BRIEF DESCRIPTION OF THE DRAWINGS

FIG. 4 also shows a machine installing a hardware mount according to the present invention.

DETAILED DESCRIPTION OF THE PREFERRED EMBODIMENTS

Figure 1:
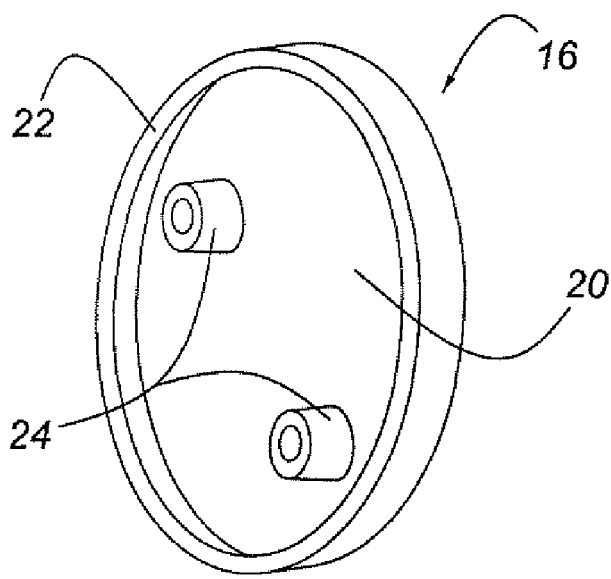
FIG. 1 is a perspective view of a lower portion of a base plate according to an aspect of the present invention.
Figure 2:
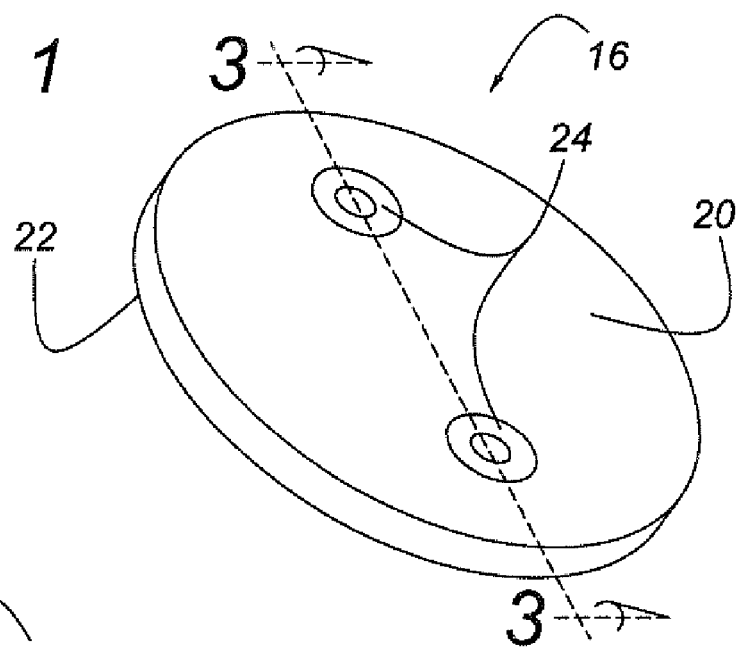
FIG. 2 is a perspective view of the top of the base plate of FIG. 1 according to an aspect of the present invention.
Figure 3:
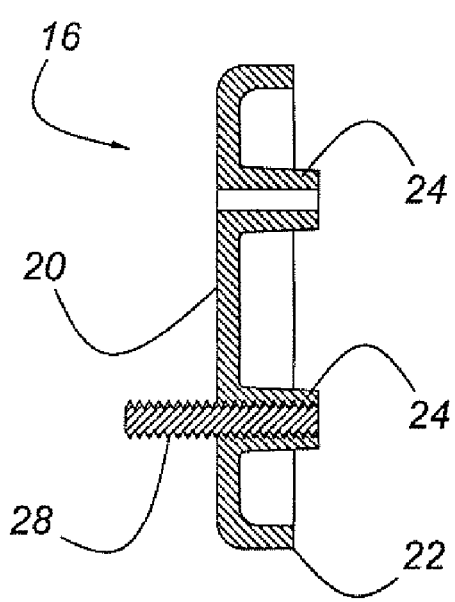
FIG. 3 is a sectional view of a base plate of FIGS. 1 and 2, taken along the line 3-3 of FIG. 2.

As shown in FIG. 1, hardware mount 16 includes a base plate, 20, having two generally tubular, internally threaded or threadable nuts, 24, attached thereto. In the embodiment of FIG. 3, a stud 28, which may be welded or threaded into base plate 20 is included as an alternative. The portion of stud 28 inserted into one of nuts 24 may be either threaded or self-tapping. As shown in FIG. 2, the upper surface of base plate 20 is smooth and provides an ideal mounting location for automotive hardware. In a preferred embodiment, nuts 24 are extruded integrally with base plate 20.

FIG. 3 illustrates spin welding initiator 22, constructed as an annular, axially extending ring employed for the purpose of forming a finished weld between hardware mount 16 and the surface to which it is being attached.

Figure 4:
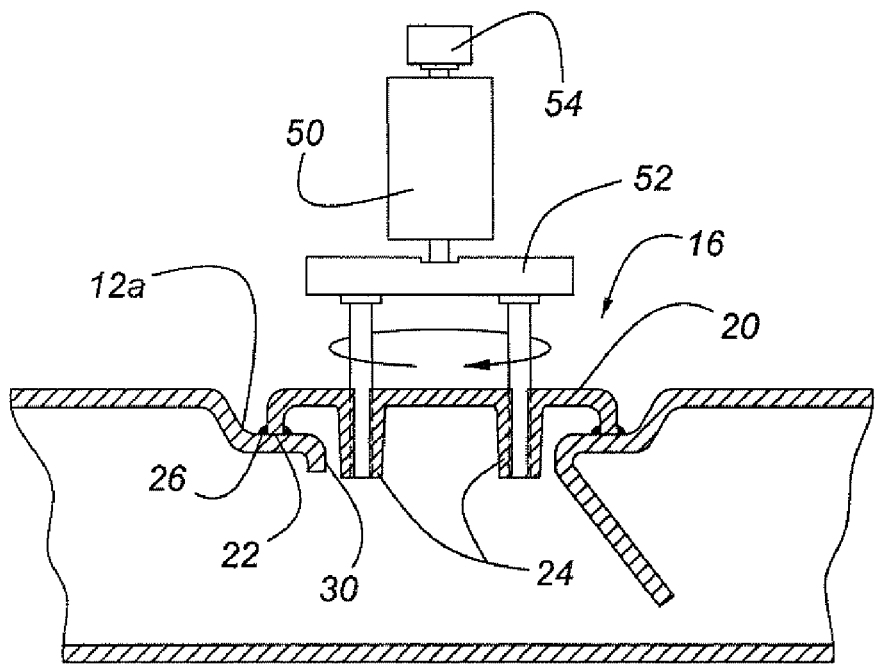
FIG. 4 is a sectional view of a tubular load bearing structure having a spin welded hardware mount according to an aspect of the present invention.

The process for spin-welding hardware mount 16 is shown in FIG. 4. Mount 16 is caused to be rotated by spin drive 50, which also applies axially directed pressure against base plate 20. The friction between spin welding initiator 22 and the upper surface, 12a, of tubular load bearing structure 12 causes a weld, 26, to be formed between initiator 22 and surface 12a. A shaft encoder, 54, counts the number of revolutions which spin drive 50 has made, so as to allow precise rotational indexing to a predetermined "clock" position as spin welded joint 26 is completed. This permits hardware to be fastened precisely by driving fasteners into tubular nuts 24.

Those skilled in the art will appreciate in view of this disclosure that any reasonable number of generally tubular fasteners 24 may be employed with the present invention. What is necessary is that aperture 30 in load bearing structure 12 be of sufficient size to allow rotational clearance of tubular threaded nuts 24, as well as any other fasteners projecting downwardly from base plate 20.

Figure 5:
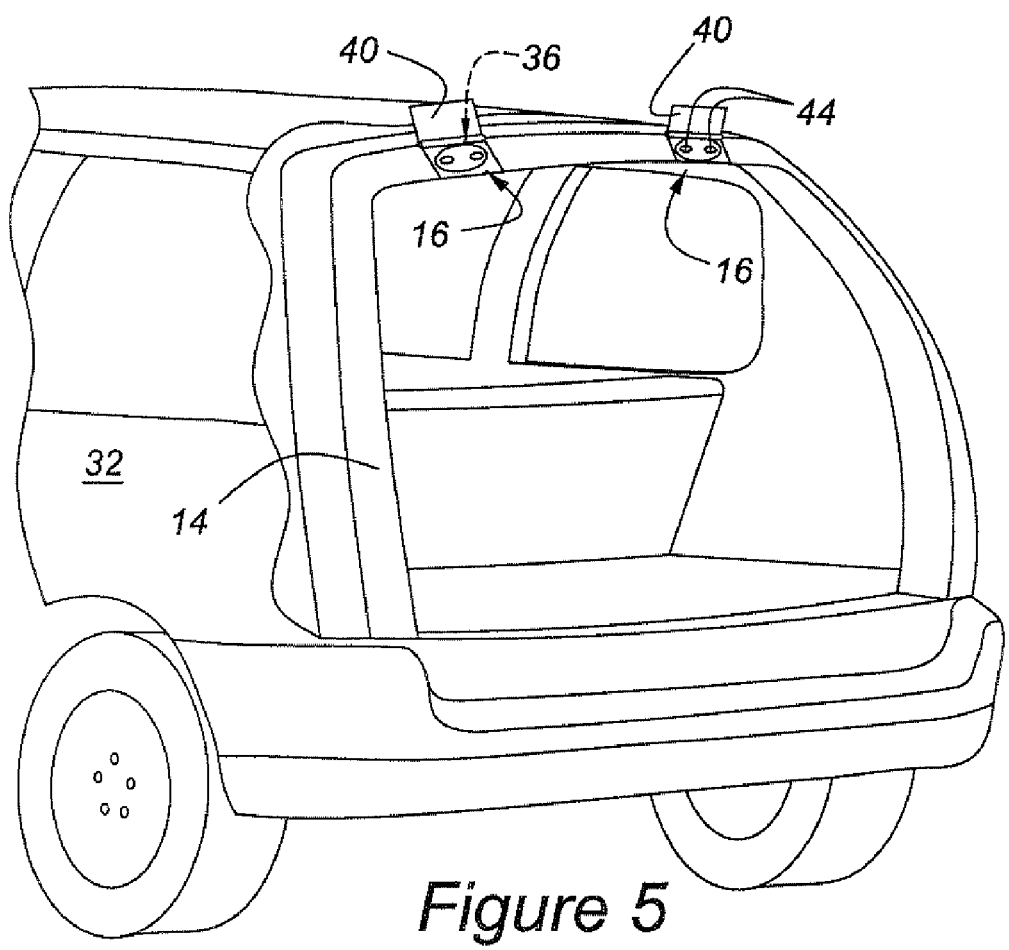
FIG. 5 illustrates a van body having a hydroformed D-pillar incorporating rotationally-indexed, spin-welded hardware mounts according to the present invention.

FIG. 5 illustrates, van body 32, which has a hydroformed D-pillar hoop, 14, to which two hardware mounts 16 have been attached according to an aspect of the present invention. Bolts 44 threaded into hardware mounts 16 attach hinges 40 (one is shown). FIG. 5 also shows reinforcements 36, which are applied to load bearing structure 14 by welding bonding, or other fastening techniques known to those skilled in the art, before hardware mounts 16 are spin welded to reinforcement 36. As noted above, base plate 20 and generally tubular threaded nuts 24 may economically and precisely be formed by an extrusion process.

While particular embodiments of the invention have been shown and described, numerous variations and alternate embodiments will occur to those skilled in the art. Accordingly, it is intended that the invention be limited only in terms of the appended claims.

What is claimed is:

1. An automotive body structure, comprising:
    a tubular, load bearing structure;
    a hardware mount comprising a base plate having an annular, axially extending spin welding initiator;
    a spin-welded joint between said tubular load bearing structure and said hardware mount.

2. The automotive body structure according to claim 1, wherein said hardware mount further comprises a fastener attached to said base plate.

3. The automotive body structure according to claim 2, wherein said fastener comprises a generally tubular, threadable nut which is integral with said base plate.

4. The automotive body structure according to claim 2, wherein said fastener comprises a threaded stud which is integral with said base plate.

5. The automotive body structure according to claim 2, wherein said fastener comprises a threaded stud which is welded to said base plate.

6. The automotive body structure according to claim 3, wherein said tubular nut and said base plate are extruded as a single unit.

7. The automotive body structure according to claim 1, wherein said hardware mount further comprises a plurality of fasteners which are attached to said base plate.

8. The automotive body structure according to claim 1, wherein said hardware mount further comprises a plurality of generally tubular fasteners which are extruded integrally with said base plate.

9. The automotive body structure according to claim 1, wherein said hardware mount further comprises a plurality of fasteners which are attached to said base plate, with said generally tubular fasteners extending through a common aperture into the interior of said tubular load bearing structure.

10. The automotive body structure according to claim 9, wherein said plurality of fasteners comprises at least one generally tubular threaded nut formed integrally with said base plate, with said generally tubular fasteners extending through a common aperture into the interior of said tubular load bearing structure.

11. The automotive body structure according to claim 1, wherein said tubular load bearing structure comprises a hydroformed member.

12. A method for mounting hardware to an automotive body structure, comprising:
    forming a tubular, load bearing structure;
    spin welding a hardware mount, incorporating at least a first fastener, to said tubular load bearing structure; and
    attaching a hardware item to said hardware mount with at least a second fastener.

13. The method according to claim 12, wherein said first fastener comprises a threaded fastener.

14. The method according to claim 12, wherein said second fastener comprises a threaded fastener.

15. The method according to claim 12, wherein said first fastener comprises a threaded nut which is integral with said hardware mount, and said second fastener comprises a threaded bolt.

16. The method according to claim 12, wherein said first fastener comprises a threadable nut which is integral with said hardware mount, and said second fastener comprises a self-tapping screw.

17. The method according to claim 12, further comprising applying a localized reinforcement to said tubular load bearing structure at the location of the hardware mount prior to spin welding the hardware mount.

18. The method according to claim 12, wherein said hardware mount comprises a base plate with an integral extruded spin welding initiator and a plurality of extruded fasteners oriented so as to extend through a common aperture into the interior of said tubular load bearing structure.

19. The method according to claim 12, wherein said hardware item comprises a hinge for a door.

* * * * *